(12) United States Patent  (10) Patent No.: US 7,793,647 B2
Skovgaard-Soerensen  (45) Date of Patent: Sep. 14, 2010

(54) METHOD AND DEVICE FOR SAWING A WORKPIECE

(75) Inventor: Frank Skovgaard-Soerensen, Halsbruecke (DE)

(73) Assignee: Siltronic AG, Munich (DE)

( * ) Notice: Subject to any disclaimer, the term of this patent is extended or adjusted under 35 U.S.C. 154(b) by 0 days.

(21) Appl. No.: 11/958,856

(22) Filed: Dec. 18, 2007

(65) Prior Publication Data

US 2008/0149085 A1  Jun. 26, 2008

(30) Foreign Application Priority Data

Dec. 20, 2006 (DE) .................. 10 2006 060 358

(51) Int. Cl.
*B28D 1/06* (2006.01)
(52) U.S. Cl. .................. 125/16.02; 125/21; 451/60
(58) Field of Classification Search .............. 125/16.02, 125/21; 451/41, 60
See application file for complete search history.

(56) References Cited

U.S. PATENT DOCUMENTS

| | | | | |
|---|---|---|---|---|
| 5,327,921 A | * | 7/1994 | Mokuo et al. | 134/182 |
| 5,681,392 A | * | 10/1997 | Swain | 118/407 |
| 5,750,440 A | * | 5/1998 | Vanell et al. | 438/692 |
| 5,771,876 A | | 6/1998 | Egglhuber | |
| 5,817,711 A | * | 10/1998 | Kambe et al. | 524/501 |
| 6,113,473 A | * | 9/2000 | Costantini et al. | 451/60 |
| 6,390,896 B1 | * | 5/2002 | Huber et al. | 451/59 |
| 6,543,434 B2 | | 4/2003 | Holzmuller | |
| 6,773,333 B2 | | 8/2004 | Lundt et al. | |
| 6,832,606 B2 | * | 12/2004 | Yamada et al. | 125/13.01 |
| 6,941,940 B1 | * | 9/2005 | Zavattari et al. | 125/16.02 |
| 2003/0089362 A1 | * | 5/2003 | Yamada et al. | 125/13.01 |

FOREIGN PATENT DOCUMENTS

| | | |
|---|---|---|
| DE | 19841492 A1 | 3/2000 |
| DE | 10064066 A1 | 5/2001 |
| DE | 19959414 A1 | 6/2001 |
| DE | 10122628 A1 | 11/2002 |
| JP | 05124026 A | 5/1993 |
| JP | 11198020 A | 7/1999 |

OTHER PUBLICATIONS

Derwent Abstract of DE 10064066 A1.

* cited by examiner

*Primary Examiner*—Maurina Rachuba
(74) *Attorney, Agent, or Firm*—Brooks Kushman P.C.

(57) ABSTRACT

A device suitable for sawing a workpiece, contains a wire web formed by a sawing wire or adapted to receive such a wire web, a forward feed instrument holding a semiconductor workpiece to be sawed and feeding the workpiece in the direction of the wire web, and a reservoir filled with a sawing suspension, the reservoir being arranged and filled such that at least the part of the sawing wire which is in engagement during the sawing process is immersed into the sawing suspension of the reservoir.

11 Claims, 1 Drawing Sheet

METHOD AND DEVICE FOR SAWING A WORKPIECE

BACKGROUND OF THE INVENTION

1. Field of the Invention

The invention relates to a method for sawing a workpiece, and also to a device useful therefor.

2. Background Art

In order to saw a workpiece by slicing a multiplicity of wafers from this workpiece, wire saws are commonly used. Wire saws are suitable in particular for slicing a multiplicity of semiconductor wafers, solar wafers and other crystal wafers from a crystal piece in one working step.

The functional principle of such a wire saw is described in U.S. Pat. No. 5,771,876. Wire saws have a wire web, which is formed by a sawing wire which is wound around two or more wire feed or guide rolls. The sawing wire may be covered with a cutting layer, as disclosed in U.S. Pat. No. 6,390,896 B1. When using wire saws having a sawing wire without firmly bound cutting abrasive, cutting abrasive in the form of a suspension (slurry) is supplied during the slicing process.

During the slicing process, the workpiece, fastened on a table, passes through the wire web, in which the sawing wire is arranged in the form of wire sections lying parallel to one another. The passage through the wire web is brought about by means of a relative movement between the table and the wire web, induced by means of a forward feed device, which feeds the workpiece against the wire web (table forward feed) or the wire web against the workpiece.

Conventionally, the workpiece is connected to a sawing beam, into which the sawing wire cuts after having sliced through the workpiece. The sawing beam may for example be a graphite beam, which is adhesively bonded or cemented onto the circumferential surface of the workpiece. Lastly, the workpiece with the sawing beam is cemented onto the table. After slicing, the sliced wafers remain fixed on the sawing beam like the teeth of a comb and thus can be taken out of the wire saw. Subsequently, the remaining sawing beam is removed from the wafers.

It has been found that in the case of wire sawing, sawing grooves (sawing tracks) occur on the sliced wafers in the region of the wire exit. It is highly desirable to eliminate such sawing grooves or to minimize their number and size. No method which makes it possible to avoid these sawing grooves is known in the art.

SUMMARY OF THE INVENTION

It was an object of the present invention to provide a method for minimizing occurrence of sawing grooves in the region of the wire exit. These and other objects are achieved by a method for sawing a workpiece in which the workpiece is fed through a wire web formed by a sawing wire, characterized in that kerfs of the workpiece are filled with sawing suspension during the sawing process.

DETAILED DESCRIPTION OF THE PREFERRED EMBODIMENT(S)

Figure 1:
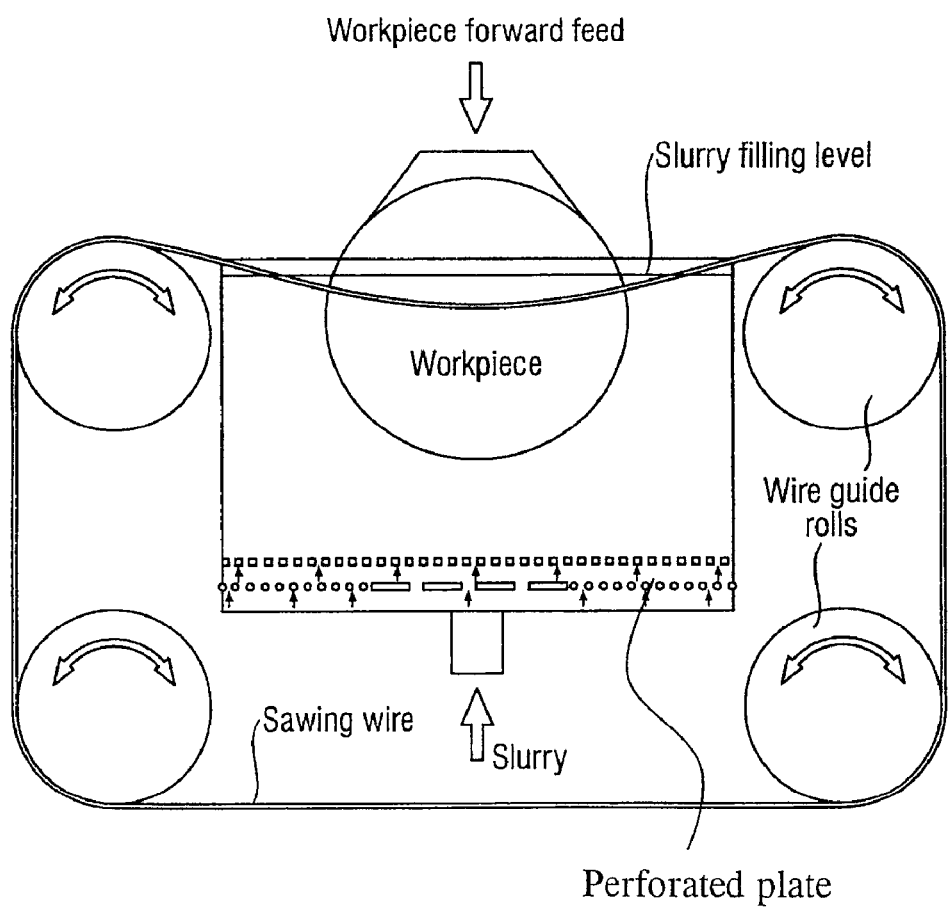
FIG. 1 schematically shows a preferred embodiment of the device according to the invention.

The workpiece is preferably immersed into a reservoir which is filled with the sawing suspension, so that the kerfs of the workpiece become filled with sawing suspension. The sawing suspension preferably contains an abrasive and a carrier liquid.

The invention also relates to a device that is suitable for sawing a workpiece, which comprises a wire web formed by a sawing wire, a forward feed instrument holding the workpiece to be sawed and feeding the workpiece in the direction of the wire web, as well as a reservoir filled with a sawing suspension, the reservoir being positioned and filled such that at least the part of the sawing wire which is in engagement during the sawing process is respectively immersed into the sawing suspension of the reservoir.

The inventor have discovered that after sawing suspension is applied onto the sawing wire according to the prior art, demixing of the sawing suspension takes place in the sawing kerf. In this demixing of the sawing suspension, the sawing suspension is separated into abrasive constituents (for example silicon carbide, SiC) and carrier liquid (for example glycol). The inventor has furthermore surprisingly discovered that the observed sawing grooves are attributable to this demixing of the sawing suspension in the sawing kerf. The demixing of the sawing suspension can be avoided by the method according to the invention.

Demixing is prevented in the inventive process by using a device according to the invention, wherein the sawing kerfs are filled with sawing suspension during the slicing process, preferably by means of the workpiece to be sawed being immersed into the reservoir filled with a sawing suspension, the reservoir being filled from below. The sawing suspension is in this case preferably supplied via one or more nozzles fitted on or proximate the bottom of the reservoir. This supply arrangement prevents sedimentation of the abrasive.

The end sides of the reservoir, which lie parallel to the wire running direction, are preferably configured so that they protrude beyond the upper edges of the side faces of the reservoir. This ensures that the sawing suspension flows out of the reservoir parallel to the wire running direction, i.e. the flow lines of the sawing suspension flowing out of the reservoir extend parallel to the wire running direction.

The shape of the reservoir and the nozzle(s) on the bottom of the reservoir are configured so that a maximally laminar flow of the sawing suspension is formed in the trough. This is preferably achieved by various perforated plates, which produce a uniform pressure distribution in the sawing suspension at the bottom of the reservoir.

Owing to the fact that the entire sawing kerf is filled with sawing suspension, demixing of the sawing suspension is prevented. This is based on the fact that the concentration gradient of the liquid of the sawing suspension between the sawing kerf and the surroundings is smaller. The carrier liquid remains in the sawing kerf and is transported with the wire. As a result, no depletion of abrasive takes place at the wire exit. The sawing grooves (sawing tracks) formed in the prior art are therefore avoided.

Another advantage of the invention is that uniform thermal regulation of the entire workpiece can be ensured throughout the method. Negative temperature effects can therefore likewise be avoided. As a further improvement over the prior art, a sawing suspension or slurry "circuit" can furthermore be obviated.

DE 19841492 A1 discloses a wire saw with firmly bound abrasive, without supplying a sawing suspension, and provides a container filled with a coolant, for example water, into which the semiconductor ingot or workpiece is immersed during sawing. Optimal cooling of the kerfs is thereby intended to be achieved. The device described therein is thus intended to achieve an object very different to that of the present invention.

The invention will be illustrated below with the aid of FIG. 1, which schematically shows a preferred embodiment of the device according to the invention.

FIG. 1 shows four wire feed rolls, around which the sawing wire is wound. A wire web is thereby formed. The workpiece is fastened on a support plate and is fed from above in a forward feed direction through the wire web. Also represented is a reservoir, which is filled with a sawing suspension. A nozzle, via which the sawing suspension is supplied into the reservoir, is fitted on the bottom of the reservoir. The workpiece is immersed progressively into the sawing suspension. This ensures that the sawing kerfs are filled with sawing suspension throughout the method.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for sawing a semiconductor workpiece, in which the workpiece is fed through a wire web formed by a sawing wire having no bonded abrasive thereon, characterized in that kerfs of the workpiece are filled with a sawing suspension containing abrasive grains as a cutting abrasive, the sawing suspension is supplied from below into a reservoir containing the sawing suspension through which the sawing wire runs, via one or more sawing suspension supply inlets positioned on or proximate the bottom of the reservoir, during the sawing process.

2. The method of claim 1, wherein the workpiece is immersed into a reservoir which is filled with the sawing suspension.

3. The method of claim 2, wherein the sawing suspension contains an abrasive and a carrier liquid.

4. The method of claim 1, wherein the sawing suspension flows out of the reservoir in a direction parallel to the wire running direction.

5. The method of claim 1, wherein the reservoir is configured and filled such that at least the part of the sawing wire which is in engagement during the sawing process is immersed into the sawing suspension of the reservoir, so that the kerfs of the workpiece become filled with the sawing suspension.

6. The method of claim 1, wherein the sawing suspension flows from below through a perforated plate positioned between the supply inlets and the wire of the wire web.

7. The method of claim 1, wherein end sides of the reservoir, oriented parallel to a wire running direction, protrude beyond upper edges of side faces of the reservoir.

8. A device suitable for sawing a workpiece by the method of claim 1, which comprises a wire web formed by a sawing wire, a forward feed instrument holding the workpiece to be sawed and feeding the workpiece in the direction of the wire web, and a reservoir filled with a sawing suspension, the reservoir being configured and filled from below via one or more sawing suspension supply inlets positioned on or proximate the bottom of the reservoir, such that at least the part of the sawing wire which is in engagement during the sawing process is immersed into the sawing suspension of the reservoir.

9. The device of claim 8, further comprising a perforated plate positioned between the inlets and the wire of the wire web.

10. The device of claim 8, wherein end portions of the reservoir extend upwards beyond side portions of the reservoir such that the sawing suspension exits the reservoir in a direction parallel with a wire running direction.

11. The method the claim 1, wherein the abrasive grains comprise silicon carbide.

* * * * *